· US008737816B2

(12) United States Patent
Braun et al.

(10) Patent No.: US 8,737,816 B2
(45) Date of Patent: May 27, 2014

(54) SYSTEM FOR SELECTING VIDEO TRACKS DURING PLAYBACK OF A MEDIA PRODUCTION

(75) Inventors: Jeff Braun, Orinda, CA (US); Zane Vella, San Francisco, CA (US); Joseph Rice, Oakland, CA (US); Ole Lutjens, San Francisco, CA (US)

(73) Assignee: Hollinbeck Mgmt. GmbH, LLC, Wilmington, DE (US)

( * ) Notice: Subject to any disclaimer, the term of this patent is extended or adjusted under 35 U.S.C. 154(b) by 2211 days.

(21) Appl. No.: 10/636,507

(22) Filed: Aug. 6, 2003

(65) Prior Publication Data

US 2004/0126085 A1    Jul. 1, 2004

Related U.S. Application Data

(60) Provisional application No. 60/401,526, filed on Aug. 7, 2002.

(51) Int. Cl.
*G11B 27/00* (2006.01)
*H04N 5/93* (2006.01)
*H04N 9/80* (2006.01)

(52) U.S. Cl.
USPC ........... 386/286; 386/239; 386/248; 386/278; 386/285

(58) Field of Classification Search
USPC ................ 386/46, 70, 98, 126, 69, 239–248, 386/278–290; 715/723, 840
See application file for complete search history.

(56) References Cited

U.S. PATENT DOCUMENTS

| 4,975,771 | A |   | 12/1990 | Kassatly |
|---|---|---|---|---|
| 5,404,295 | A |   | 4/1995 | Katz et al. |
| 5,734,862 | A |   | 3/1998 | Kulas |
| 5,850,545 | A |   | 12/1998 | Matsushita |
| 5,895,124 | A | * | 4/1999 | Tsuga et al. .................... 386/98 |
| 5,913,010 | A |   | 6/1999 | Kaneshige et al. |
| 5,923,627 | A | * | 7/1999 | Miwa et al. .................... 386/70 |
| 5,929,857 | A | * | 7/1999 | Dinallo et al. ................ 715/840 |
| 5,963,256 | A |   | 10/1999 | Tahara |

(Continued)

FOREIGN PATENT DOCUMENTS

| EP | 0 785 675 | 7/1997 |
|---|---|---|
| JP | 07210174 | 8/1995 |

OTHER PUBLICATIONS

Bargeron, et al. "Annotations for Streaming Video on the Web", CHI '99 Extended Abstracts on Human Factors in Computing Systems, ACM Press, published 1999, pp. 278-279.

(Continued)

*Primary Examiner* — Hung Dang
(74) *Attorney, Agent, or Firm* — Knobbe, Martens, Olson & Bear LLP

(57) ABSTRACT

A single control allows selection and display of different video sequences from a DVD. No screen graphics are necessary to assist the user with operation, such as to show which buttons correspond to which sequences. A dedicated control, such as a button on a DVD player or television remote control device, is used to switch between two possible video tracks, or to otherwise select among multiple video tracks. Full-screen video tracks can be displayed without the need for visual indicators, such as thumbnail images, to identify selectable video tracks associated with different controls. Another aspect of the invention allows for modification of control information, such as navigation information, within a playback device.

18 Claims, 9 Drawing Sheets

(56) References Cited

U.S. PATENT DOCUMENTS

| | | | |
|---|---|---|---|
| 5,999,698 A | 12/1999 | Nakai et al. | |
| 6,006,241 A | 12/1999 | Purnaveja et al. | |
| 6,085,185 A | 7/2000 | Matsuzawa et al. | |
| 6,088,506 A * | 7/2000 | Yoshio et al. | 386/46 |
| 6,105,063 A | 8/2000 | Hayes, Jr. | |
| 6,173,287 B1 | 1/2001 | Eberman et al. | |
| 6,173,317 B1 | 1/2001 | Chaddha et al. | |
| 6,175,595 B1 | 1/2001 | Keesman | |
| 6,245,982 B1 | 6/2001 | Suzuki et al. | |
| 6,246,401 B1 * | 6/2001 | Setogawa et al. | 715/723 |
| 6,256,453 B1 * | 7/2001 | Takano | 386/126 |
| 6,263,346 B1 | 7/2001 | Rodriquez | |
| 6,289,165 B1 | 9/2001 | Abecassis | |
| 6,307,550 B1 | 10/2001 | Chen et al. | |
| 6,332,144 B1 | 12/2001 | deVries et al. | |
| 6,404,925 B1 | 6/2002 | Foote et al. | |
| 6,430,361 B2 | 8/2002 | Lee | |
| 6,430,609 B1 | 8/2002 | Dewhurst et al. | |
| 6,434,097 B1 | 8/2002 | Lewis et al. | |
| 6,449,653 B2 | 9/2002 | Klemets et al. | |
| 6,453,459 B1 * | 9/2002 | Brodersen et al. | 717/100 |
| 6,467,080 B1 | 10/2002 | Devine et al. | |
| 6,477,315 B1 | 11/2002 | Ohomori | |
| 6,483,983 B1 | 11/2002 | Takahashi et al. | |
| 6,501,770 B2 | 12/2002 | Arsenault et al. | |
| 6,546,405 B2 | 4/2003 | Gupta et al. | |
| 6,687,211 B2 | 2/2004 | Sawabe et al. | |
| 6,731,185 B2 | 5/2004 | Taniguchi | |
| 6,789,109 B2 | 9/2004 | Samra et al. | |
| 6,806,885 B1 | 10/2004 | Piper et al. | |
| 6,898,799 B1 | 5/2005 | Jarman | |
| 6,954,419 B1 | 10/2005 | Kimura et al. | |
| 6,954,581 B2 | 10/2005 | Miller et al. | |
| 6,965,723 B1 | 11/2005 | Abe et al. | |
| 6,985,188 B1 | 1/2006 | Hurst, Jr. | |
| 7,009,658 B2 | 3/2006 | Kim | |
| 7,061,930 B2 | 6/2006 | Mizobata | |
| 7,079,752 B1 | 7/2006 | Leyendecker | |
| 7,151,214 B2 | 12/2006 | Barry | |
| 7,161,079 B2 | 1/2007 | Nishitani et al. | |
| 7,334,026 B2 | 2/2008 | Samra et al. | |
| 7,565,060 B2 | 7/2009 | Hamada et al. | |
| 2001/0033736 A1 | 10/2001 | Yap et al. | |
| 2002/0032768 A1 | 3/2002 | Voskuil | |
| 2002/0092021 A1 | 7/2002 | Yap et al. | |
| 2003/0191776 A1 | 10/2003 | Obrador | |
| 2003/0236581 A1 | 12/2003 | Chambers et al. | |
| 2004/0073930 A1 | 4/2004 | Demas et al. | |
| 2004/0078215 A1 | 4/2004 | Dahlin et al. | |
| 2004/0107439 A1 | 6/2004 | Hassell et al. | |
| 2004/0181592 A1 | 9/2004 | Samra et al. | |
| 2004/0184768 A1 | 9/2004 | Seo et al. | |
| 2004/0201544 A1 | 10/2004 | Love et al. | |
| 2005/0111829 A1 | 5/2005 | Ito et al. | |
| 2005/0234958 A1 | 10/2005 | Sipusic et al. | |
| 2005/0262542 A1 | 11/2005 | DeWeese et al. | |

OTHER PUBLICATIONS

H. Kodikara, Arachchi and W.A.C., Fernando, An intelligent rate control algorithm to improve the video quality at scene transitions for off-line MPEG-1/2 encoders, IEEE Transactions on Consumer Electronics, 49(1):210-219 (Feb. 2003).

* cited by examiner

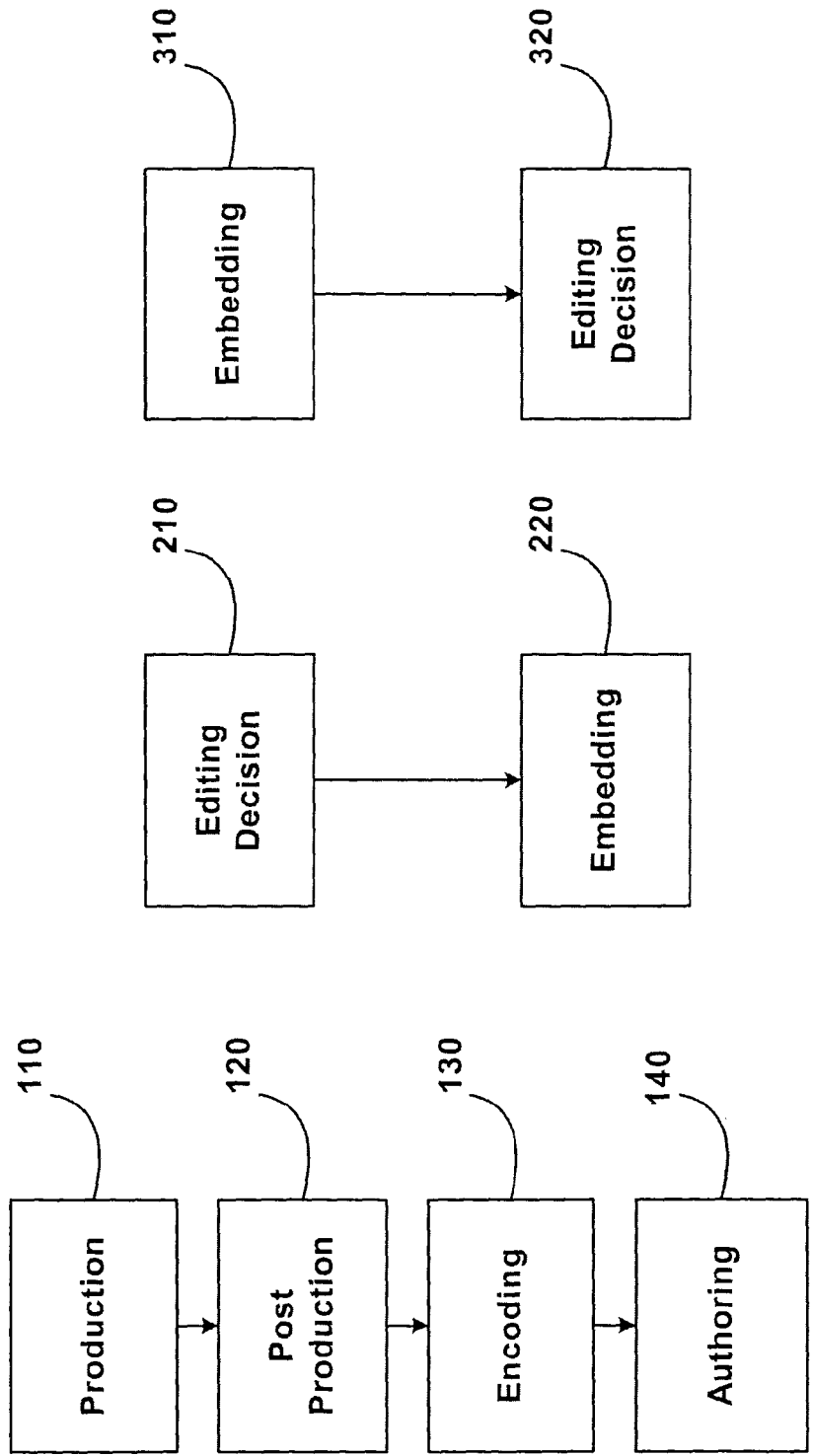

SYSTEM FOR SELECTING VIDEO TRACKS DURING PLAYBACK OF A MEDIA PRODUCTION

CROSS-REFERENCES TO RELATED APPLICATIONS

This application claims priority from U.S. Provisional Patent Application Ser. No. 60/401,526 filed Aug. 7, 2002, which is incorporated by reference herein as if set forth in full for all purposes.

BACKGROUND OF THE INVENTION

This invention relates in general to viewing of a media production of a live event and more specifically where the viewer may select from multiple available video tracks with a single button press without any displayed screen graphics to assist the user with the switch.

To provide viewers the ability to view a media production of a live event, it may be transmitted live, over a cable system or by satellite or it may be stored on a compact disk (CD), a digital versatile disk (DVD) or other suitable storage medium. The DVD has recently become one of the most popular mediums for recording media productions because DVDs provide a large amount of storage capacity in an inexpensive small form factor. Typically, the media production is stored in a compressed, encoded form such as described in *DVDs Demystified*, Second Edition, 2001 published by McGraw Hill. During playback of the recorded media production, either a software decoder or a hardware decoder decodes the encoded media production. Software decoders comprise computer instructions executed by a computer-based device such as a personal computer system. Inexpensive hardware decoders are often sold as stand-alone DVD playback devices or as part of commercially available entertainment systems that need only be coupled to a display device.

Due to the random access nature of the DVD, viewers are able to randomly access various segments, tracks, streams or other portions of the media production during playback of the media production. Moreover, due to the large storage capacity, the DVD may store multiple video tracks of the media production with each track synchronized with other video tracks so that a viewer may switch from one track to another without experiencing any noticeable gaps in the video and audio. Multi-track video content is also referred to in the art as multi-angle content.

The interactive selection of video and audio tracks allows the viewer to select from one of several video tracks of the media production. Often, when more than one camera is used to film a media production, the video track from each camera is stored on the DVD so that the entire scene is made available to the viewer rather than just the single track prepared as the director's cut. A viewer may select one of several camera views provided on the DVD to modify their viewing of the media production. The viewer can scan the available tracks by pressing dedicated "angle" button on the DVD remote control device to select a different viewing angle. However, the use of dedicated buttons imposes constraints on both the director when preparing the media production for recording on the DVD and the viewer when attempting to access one of available video tracks. Notwithstanding the cumbersome nature of prior art video angle selection schemes, angle selection advantageously provides viewers some degree of control over viewing of a media production and as such is a very popular feature of DVD recorded media productions. Unfortunately, every DVD player interprets the multi-angle feature differently, making it difficult for directors to prepare multi-angle content for recording on DVD and for viewers to access the multiple synchronized video and audio tracks stored on a DVD.

To illustrate the problems that arise from the use of dedicated buttons for interactive selection of synchronized video tracks (e.g., "angles," "scenes," etc.), a number of problems arise. For example, one such problem is that the viewer can be confused whether a change of viewing angle resulted from the viewer's pressing of the dedicated "angle" button or was an edit in the initial video track. The confusion arises because the viewer is not certain that the video switch was completed. DVD "angle" button selections indications are confusing as it is not always obvious whether additional video tracks are available at any given time of playback or whether the additional tracks provide different unique viewing angles. This confusion is compounded because there is no standard mechanism for the viewer to know when additional viewing angles are available or to ascertain what content, if any, is present on alternate tracks recorded on the DVD.

Yet another problem arises because some DVD playback devices inform the viewer from a menu page at the start of playback that "camera 1" is a close-up view and "camera 2" is a wide view. Unfortunately, this solution requires the viewer to remember angle information for various cameras while viewing the media production. Clearly, this type of solution imposes an unnecessary burden on the viewer to recall camera placement while viewing the production. If the viewer forgets, the playback must be interrupted so that the menu page displayed so that a new angle may be selected. Not only is this process slow but the viewer's enjoyment is diminished because the delay in switching from one angle, to the menu page and then to a new angle interrupts the continuity of the media production. Compounding the viewer's problem is that other media productions may assign different angles to the cameras. Another drawback with this type of solution is that the film crew must strictly adhere to the disclosed camera placement when recording the media production.

Furthermore, variations and complexities in the viewer interface of most commercial DVD playback devices render playback systems unwieldy and confusing when new features are added to the DVD. Specifically, implementation of angle selection functionality differs from player to player, leading to user confusion, and slow user acceptance or comprehension of the feature. Typically, the viewer interface requires use of a specialized 'angle' button resulting in DVD playback device and entertainment systems that are unwieldy and confusing.

A typical control for stream switching is a DVD player, or television, handheld remote control. These familiar devices usually have a couple of dozen buttons for selecting channels, entering numbers, controlling the DVD transport (e.g., play, pause, skip, reverse), selecting a video source, and other options. Specific DVD players may provide a remote control, or other device, and interface for selecting or switching angles or scenes. In one approach, a DVD author assigns a video track (i.e., an angle or stream) to a specific button on the remote control. For example, numeric button "1" is used to select a first angle, button "2" a second angle, button "3" a third angle, and so on. However, with the prior art approaches it is often difficult for a viewer to know what angle will result from depressing a given key. This is especially true when the angles assigned to different keys change during playback of the DVD.

One approach to solving this problem is to provide on-screen "thumbnail" images of the different possible angles, or selections. Each thumbnail is a miniature version of the stream, or angle, selected upon pressing the corresponding button. For example, if the thumbnails are laid out left-to-right then the leftmost thumbnail can correspond to button "1," the middle thumbnail to button "2" and the rightmost thumbnail to button "3." Other ways to indicate thumbnail assignments to buttons are possible, such as by labeling each thumbnail with an adjacent numeral depending on the button association. An example of a DVD production that uses thumbnails can be found in, e.g., "Olympic Skating Exhibition Highlights," Copyright 1998, CBS Worldwide, and copyright 1998 Panasonic Interactive Media Company, CD-PDV-0002.

A drawback with the thumbnail approach is that the thumbnails take up valuable screen space. Also, the thumbnails may be too small for a viewer to easily determine the nature of a stream or angle that will result from a selection. A redundant thumbnail of the currently-viewed track is usually needed as a placeholder so that the thumbnails on the screen maintain a visual correlation to control buttons. In other words, if there are 3 different angle choices, then there will always be three different thumbnails showing on the screen even though one of the thumbnails is just a miniature version of the full-screen currently selected track. Finally, the viewer is bothered by having to remember the respective associations and resulting button actions—a seemingly minor chore but one that can cause enough distraction to prevent the viewer from enjoying a production that is being played back from the DVD.

Approaches to improve upon user selection of streams or tracks during DVD playback are limited due to the need to comply with DVD standards. These standards, as promulgated by the DVD Forum dictate the requirements and limitations of specifying button assignments.

According to the standards, for single angle presentations, video, audio, subpicture, and navigation data are multiplexed together in what can be thought of as one continuous stream. A DVD player reads this information via laser pickup, loads it into a buffer, and then demultiplexes and processes the presentation (video/audio/subpicture) and navigation information.

The multiplex structure is illustrated in FIG. 6. FIG. 6 shows a portion of an object file of a DVD production having a single video angle with three audio streams and one subpicture stream. The format of a production in a stored medium such as a DVD is dictated in large part by the DVD standards. The object file that is used to create an end user product such as a DVD usually closely follows the same standard.

FIG. 7 shows an object file with multiple video angles. When multiple video angles are present each angle contains multiplexed data, as with the single-angle case, including subpicture data (containing button highlights) and navigational information (including button commands). The information is not shared across angles but, instead, is replicated in each angle. For example, a multiangle presentation with three audio streams ends up with the data for those three audio streams existing, redundantly, multiple times on the disc, in each angle. Each angle's data is interleaved within interleave units (ILVUs), which contain multiple blocks of video, audio, navigation, and subpicture data.

When a DVD player encounters an ILVU, it plays only the blocks containing data for the currently selected angle, skipping over the data for the other angles. The diagram of FIG. 7 shows the configuration of video, three audio, and one subpicture streams in a two-angle presentation.

SUMMARY OF THE INVENTION

One embodiment of the invention allows display of different video tracks according to a viewer's selection during playback. A preferred embodiment of the invention does not require the use of thumbnail images, or other visual indicators, on-screen. A dedicated control, such as a button on a DVD player or television remote control device, is used to switch between two possible tracks, or to otherwise select among multiple tracks. In a one-button approach, a single button is used to swap between two or more different video tracks.

A method of attaining single-control, multiple switching includes a system whereby a DVD object file is modified to allow different functionality than that provided by a DVD authoring system that originally created the object file. In a preferred embodiment, control information is read from a DVD by a playback device and modified to achieve desired functionality, such as the single-control (e.g., one-button) switching.

One embodiment provides a method for switching between first and second video tracks during playback of a recorded live event, wherein the video tracks are synchronized with each other, the method comprising displaying the first video track in full-frame on a display device, wherein the first video track is displayed without overlaying screen graphics describing a video track selection; accepting a first signal from a control operated by a human user; displaying, in response to the first signal from the control, the second video track in full-frame on the display device, wherein the second video track is displayed without overlaying screen graphics describing a video track selection; accepting a second signal from the control; and displaying, in response to the second signal, the first video track in full-frame on a display device, wherein the first video track is displayed without overlaying screen graphics describing a video track selection.

In another embodiment the invention provides an apparatus for switching between first and second video tracks during playback of a recorded live event, wherein the video tracks are synchronized with each other, the apparatus comprising a process for displaying the first video track in full-frame on a display device, wherein the first video track is displayed without overlaying screen graphics describing a video track selection; a process for accepting a first signal from a control operated by a human user; a process for displaying, in response to the first signal from the control, the second video track in full-frame on the display device, wherein the second video track is displayed without overlaying screen graphics describing a video track selection; a process for accepting a second signal from the control; and a process for displaying, in response to the second signal, the first video track in full-frame on a display device, wherein the first video track is displayed without overlaying screen graphics describing a video track selection.

In another embodiment the invention provides a computer-readable medium including one or more instructions for switching between first and second video tracks during playback of a recorded live event, wherein the video tracks are synchronized with each other, the computer-readable medium comprising instructions for displaying the first video track in full-frame on a display device, wherein the first video track is displayed without overlaying screen graphics describing a video track selection; accepting a first signal from a control operated by a human user; displaying, in response to the first signal from the control, the second video track in full-frame on the display device, wherein the second video track is displayed without overlaying screen graphics describing a video track selection; accepting a second signal from the control; and displaying, in response to the second signal, the first video track in full-frame on a display device, wherein the first video track is displayed without overlaying screen graphics describing a video track selection.

In another embodiment the invention provides a method for achieving added functionality to playback of a video production stored on a medium, wherein the video production includes control information, the method comprising modifying the control information in a playback device; and using the modified control information to play back the video production.

In another embodiment the invention provides a method for modifying the functionality of a DVD audiovisual production during playback, the method comprising reading navigation pack data from the DVD, wherein the navigation pack data includes a command assignment to a user control; modifying the command assignment to the user control; and using the modified command assignment to switch video sequences during playback of the DVD audiovisual production.

BRIEF DESCRIPTION OF THE DRAWINGS

FIG. 1 is a block diagram of a method for presenting multi-view selections during playback of a media production;

FIG. 2A is a first block diagram of various steps of a post-production process;

FIG. 3A is a second block diagram of various steps of a post-production process;

DETAILED DESCRIPTION OF THE INVENTION

Figure 2B:
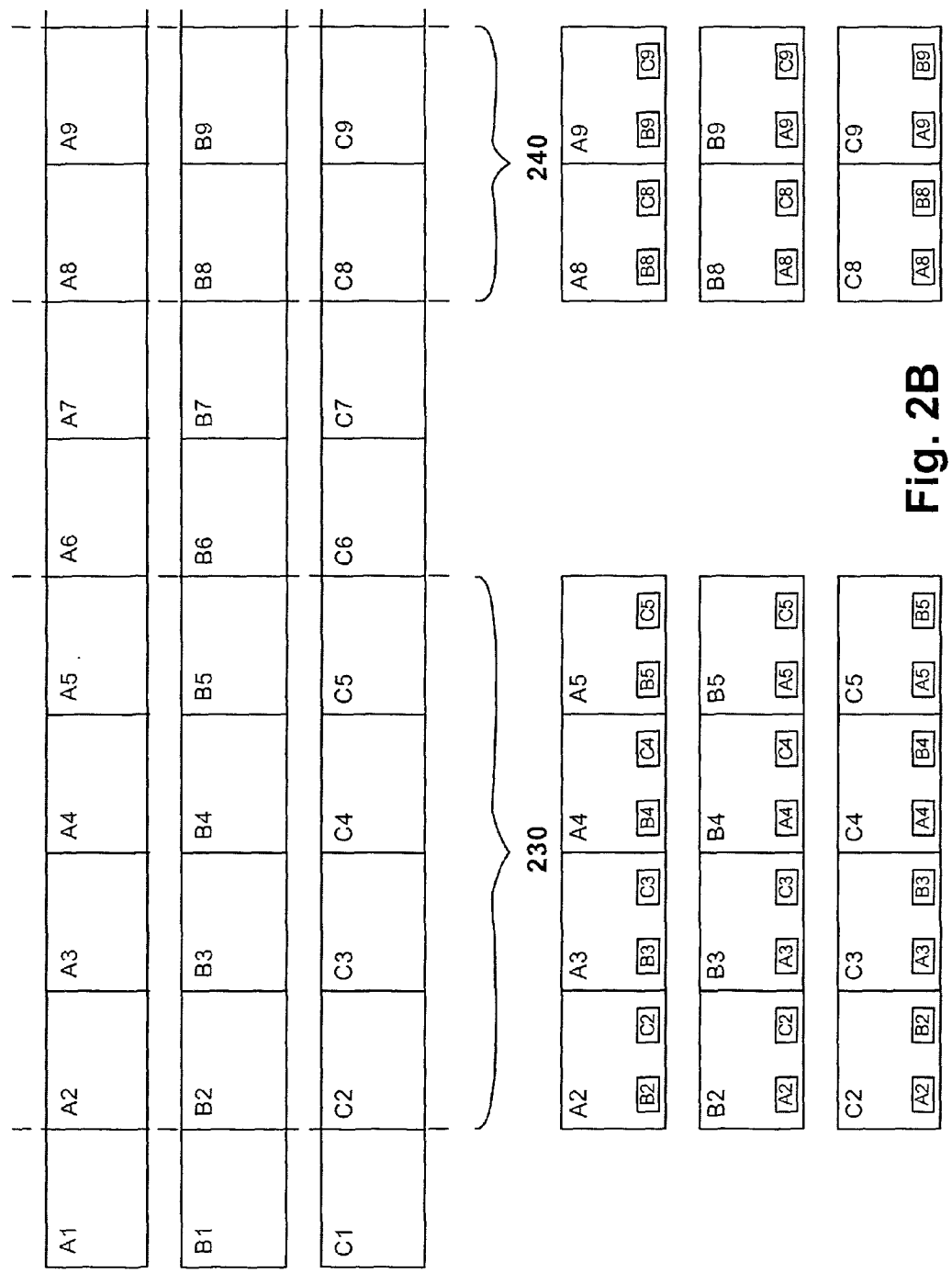
FIG. 2B is a first illustration of editing and embedding of frames.
Figure 3B:
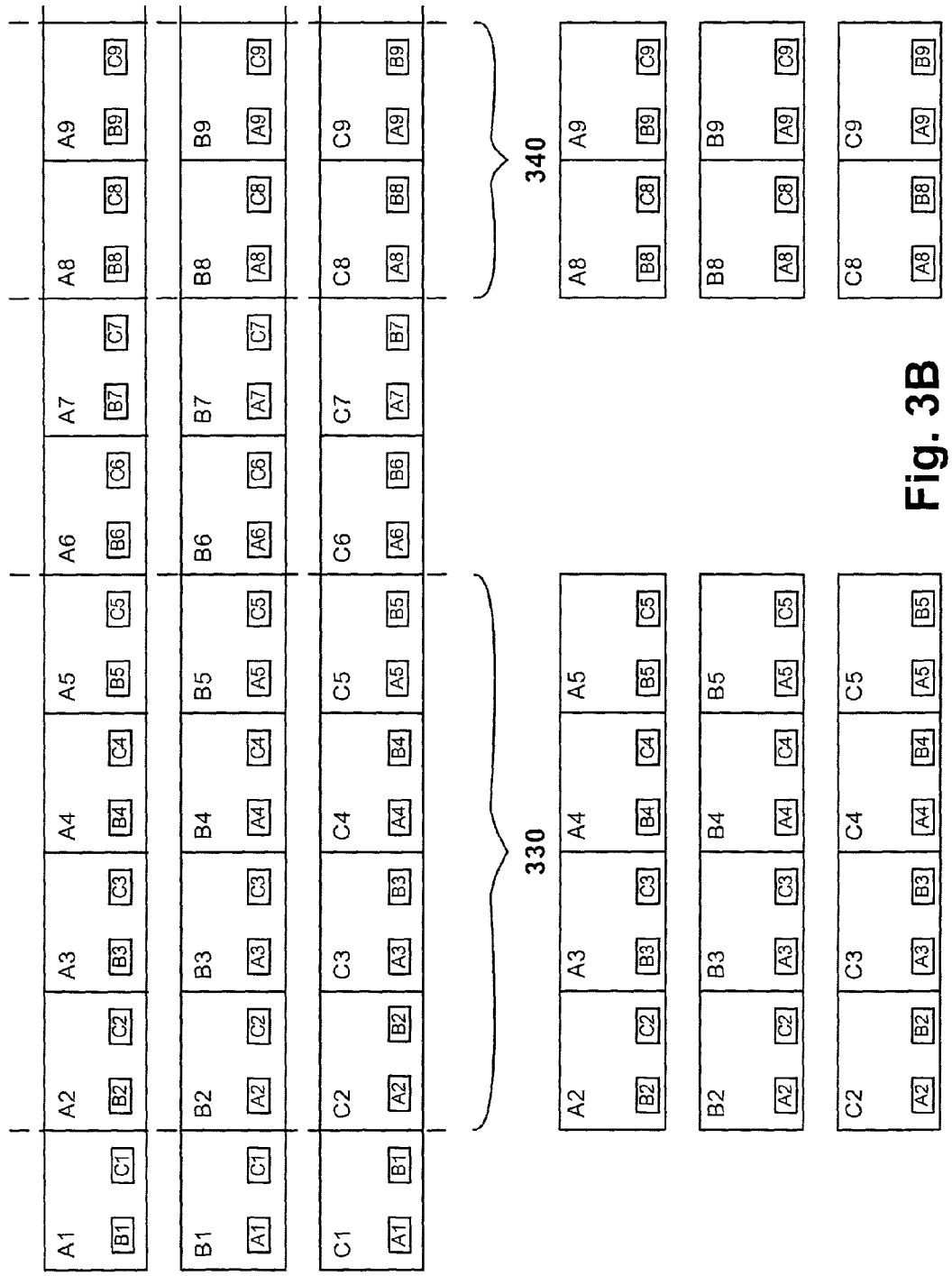
FIG. 3B is a second illustration of editing and embedding of frames.
Figure 4:
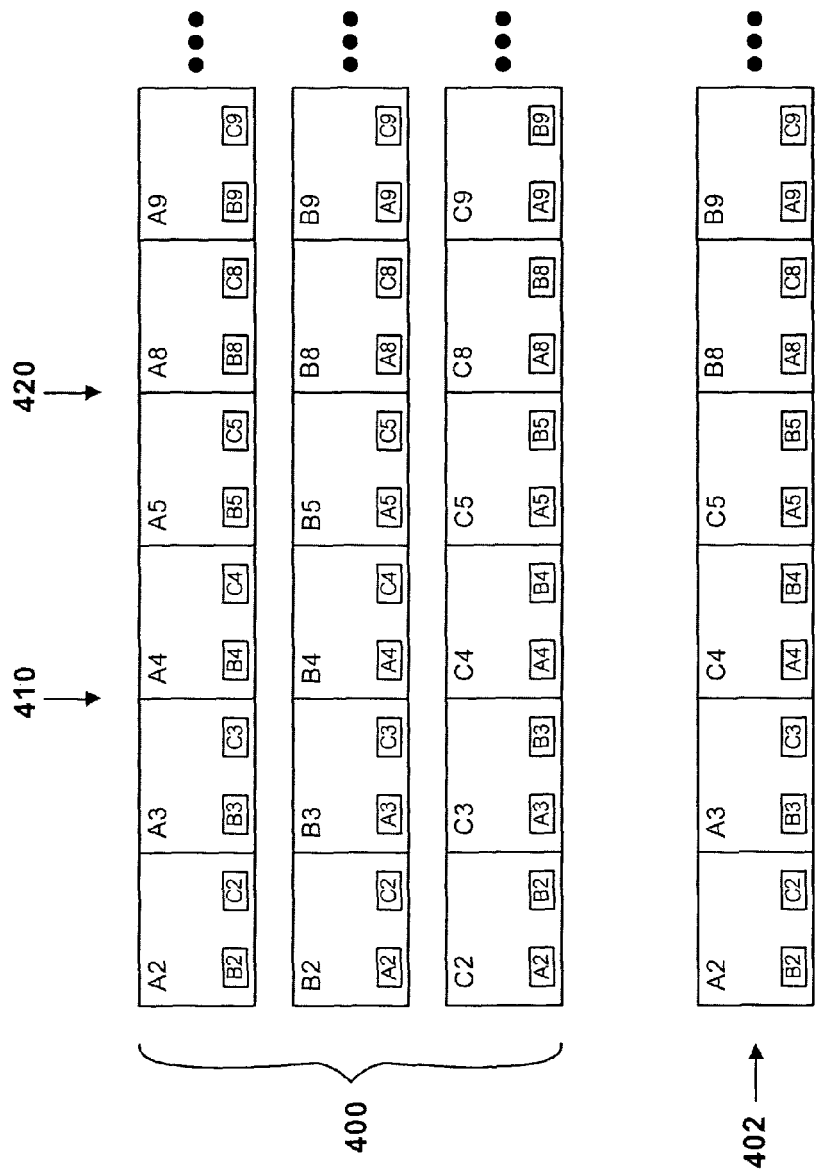
FIG. 4 illustrates presenting multi-view selections during playback of a media production.

Features of viewing multiple video tracks are presented in the first section, below. A second section presents features of a single-control for switching among multiple video tracks during playback. In the following description of a preferred embodiment, reference is made to the accompanying drawings, which form a part hereof, in which is shown by way of illustration a specific embodiment in which the invention may be practiced. In the following description, numerous specific details are set forth in order to provide a complete understanding of an embodiment of the present invention. However, it will be apparent to one skilled in the art that an embodiment of the present invention may be practiced without the specific details. In the development of the actual implementation, numerous implementation-specific decisions must be made to achieve the design goals that will vary for each implementation. Accordingly, in order not to obscure an embodiment of the present invention, well-known structures and techniques are not shown or discussed in detail.

Multiple Video Tracks

An embodiment of the present invention provides techniques for recording a live event from a plurality of perspectives for subsequent playback in a manner that is exciting and entertaining for the viewer. In particular, an embodiment of the present invention relates to a method for preparing and selectively displaying multiple video tracks during playback of a media production. In one preferred embodiment, a high capacity optical storage medium such as a digital versatile disk (DVD) provides a large amount of storage in a relatively small amount of physical space. The DVD is in wide use and is a preferred storage medium for storing large media files. As used herein any references to a DVD refers to storage medium that conforms to the DVD Specification, version 1.0, such as described in *DVDs Demystified*, Second Edition, 2001 published by McGraw Hill as well as any other suitable storage medium such as a compact disc read only memory (CDROM), video CDROM, random access memory (RAM), read-only memory (ROM), memory stick, hard disk drive, etc.

DVDs allow a playback device to randomly access various points in tracks or streams of a media production in a non-sequential manner. DVDs are well suited for storing interactive media productions for subsequent playback because of the ability to randomly access the recorded video and audio tracks. Typically, groups of video tracks are "synchronized" in their playback so that, for example, if a viewer selects to switch to playback of track B during playback of track A, playback of track B will start at a time-corresponding point in track B to that of track A. For example, if the viewer decides to switch to track B two seconds into the viewing of track A, then track B will begin displaying at a point in track B that is at, or about, two seconds into track B. One method of synchronizing groups of video tracks is to interleave portions of the tracks on the physical medium of the DVD disc, itself. Other ways of synchronizing are possible and are within the scope of the invention. For example, time code, pointers, counters or other synchronizing techniques can be used.

With their large storage capacity, DVDs may store multiple synchronized video and audio tracks. For example with current technology, DVDs store up to 7.95 gigabytes of video content in up to nine (9) video tracks and eight (8) audio tracks. One track of audio and one track of video may be selected by the viewer for viewing/listening during playback, and the primary track, which is the track displayed on a viewing device, can be changed at any time. An embodiment of an embodiment of the present invention utilizes the features and functions of industry standard DVD media and DVD playback devices because of the widespread standardized use of DVDs for distribution of media productions.

In other embodiments of the invention, the storage medium may include any high capacity storage device such as digital tape or magnetic storage devices such as are commonly found in commercially available computer systems. In still other embodiments, the storage medium may include a high bandwidth communication system such as computer server storage systems, television broadcasts or a cable or satellite distribution system capable of simultaneously delivering multiple tracks to the viewing device.

As used herein, live media productions include a plurality of digitized tracks of live event content. Further, as used herein, one track is selectively designated as the primary track and displayed in a primary portion of a viewing device. Each of the remaining tracks (collectively designated secondary tracks) is displayed in a secondary portion of the viewing device. During playback, the viewer may monitor the secondary tracks and, at any time during the playback, select one of the secondary tracks for viewing.

Each track comprises video and/or audio information that is compressed for efficient storage or transmission and decoded before display on the viewing device. The decoder may be either a software or hardware decoder but must be capable of simultaneously decoding a plurality of tracks.

Referring now to the drawings, FIG. 1 illustrates a block diagram representation of one preferred method for providing multiple tracks of a media presentation for display on a viewing device. The method includes four steps: production step 110, post-production step 120, encoding step 130, and authoring step 140.

At production step 110, various events such as, by way of example, music concerts or sporting events are recorded. The production step 110 includes the process of recording an event using a plurality of cameras (not shown) positioned to record different camera views or perspectives. Each camera generates a video and/or audio track, which together comprise a media production.

To illustrate the production step more fully, the present embodiment will be described in the context of recording a sporting event. However, it is to be understood that the production step may encompass live event video and audio recordings of any kind or nature.

In the sporting event environment, multiple cameras are typically used to provide source material for a single video track. During the sporting event, a director selects images from one of the multiple camera feeds for transmission to viewers as part of a real-time broadcast or for recording onto a storage medium. It will be appreciated that each camera feed comprises a video track. It is also common practice to include a plurality of audio microphones for recording the audio from a variety of perspectives. Each microphone comprises an audio track. Thus, the images and the sound presented to the viewer are a product of the decisions made by the director who chooses when each track is present in the media production. Although each camera will cover the event from different perspectives, such feeds are not often 'hot,' or are not included in the director's cut.

Since the multiple cameras have several different perspectives, it is a desirable feature to provide tracks from each camera and to let the viewer decide how to best mix the tracks for their personal viewing enjoyment For example, one camera may record one of the participants while other cameras will record a wide-angle perspective of the event. Still other cameras may provide specialty shots. For example, when recording a concert, the camera may focus on a musician's hands on a piano, or a drummer's view of the crowd. Because a musical performance often consists of multiple musicians playing simultaneously, it is desirable for the viewer to have a choice of which musician to focus on. Thus, in accordance with an embodiment of the present invention, all cameras are considered 'hot' continuously regardless of the director's decision to only include one of the camera feeds in the final cut. Similarly, audio tracks highlighting one or more of the musicians are each considered "hot" and simultaneously recorded as a track. The availability provides the viewer the opportunity to modify the decisions made to create the director's cut.

In order to provide multiple synchronized tracks for recording on a DVD, it is essential that the recordings of all camera feeds be synchronized with each other, and with any audio recording devices, at the time of recording. This is preferably accomplished by recording a liner numerical time code reference with each video frame. In one embodiment, the time code consists of intervals of $1/29.97^{th}$ of a second. Time codes are also included in correlated locations on the audio recording media. The time code is generated by a master clock, and provided to each camera and audio recording device. The cameras and audio recording devices are also provided with a common sync pulse (known as blackburst, or genlock) to ensure that the start of each frame occurs at precisely the same moment in that $1/29.97^{th}$ of a second. Time code generation is well known in the art and the Society of Motion Picture and Television Engineers publishes engineering specifications for generating time codes.

Each video track is labeled at the beginning of the editing session. As shown in FIG. 2B, the three tracks are labeled as track "A," track "B," and track "C" although it is understood that an arbitrary number of video tracks may be edited. Each track is aligned with the other tracks using the time code and the frames are numbered. Each frame is labeled with the letter of the track followed by a frame number. For example, frames for signal track A are labeled "A1," "A2," "A3" and so on. Frames for signal track B are labeled "B1," "B2," "B3" and so on.

At editing decision step 210, frames from each signal track are selected for a master track or director's cut edit. Typically, the master track will be designated as the primary track when recorded on the DVD. To create the master track, the director selects frames from each of the multiple tracks. For example, as shown generally in FIG. 2B, a first edit decision 230 selects a track of frames 2-5 from signal tracks A, B and C to yield track segments A2-5, B2-5 and C2-5. A second edit decision 240 selected a track of frames 8-9 from signal tracks A, B and C. Although only a few frames in each track, or track segment, are depicted in FIG. 2B, it is to be understood that the number of tracks and the number of frames in each track segment may vary depending on the media production and other artistic decisions. In actual practice, many hundreds or thousands of frames are typically used in each edit decision. Further, it is contemplated that each media production will include many hundreds or more editing decisions although only two are illustrated in FIG. 2B.

Where frames are omitted between edit decisions, such as where frames 6 and 7 are skipped to eliminate unwanted content from the final production, the transitions from the first edit track segments A2-5, B2-5, and C2-5 to the second edit track segments A8-9, B8-9, and C8-9 can be made with any type of editing and/or production operation. By way of example, editing or production operations include wipes and fades that smooth the visual transition between segments and maintain correlation with audio tracks.

Once post-production step 120 is complete, track segments A, B, and C are encoded for storage onto a playback medium at encoding step 130. The playback medium may be video CD, DVD, or other medium, such as magnetic disk drives associated with a computer system or storage network arrays associated with a server computer system. As used herein, the playback medium may also include cable, satellite, Internet or television broadcast. The encoding format for video signals may be MPEG-2 or other, and the encoding format for audio signals may be Dolby AC-3, DTS, uncompressed PCM, or other. Care must be taken when encoding video to stay within the constraints created through a combination of disc capacity, length of program material, length of track segments, and the maximum number of simultaneous tracks. Once the maximum data rate is determined, it is imperative that it not be exceeded during encoding. If the data rate spikes, or exceeds the maximum restricted by the number of simultaneous tracks, the tracks will fail to multiplex together, and the video must be re-encoded.

MPEG-2 video consists of segments of video known as Groups of Pictures, (aka GOPs). Each GOP is generally 15 frames in length, and contains a set pattern of I (Intra) P (Predictive) and B (Bi-directional) frames. MPEG-2 uses inter-frame compression, which means that frames may rely on information stored in adjacent frames to create a complete picture. The only frames that are self-contained are Intra-frames. In order to avoid visible artifacts, multi-angle material must be encoded with closed GOPs. In each closed GOP, frames only refer to adjacent frames within their GOP. In contrast, in each open GOP, frames may refer to adjacent frames across GOP boundaries.

After encoding step 130, an interactive viewer interface is superimposed onto each track segment A, B and C at authoring step 140. The interactive viewer interface may be an on-screen button or other means that enables the viewer to switch to a different track segment. The buttons can be invisible such that a button exists, and is activated by pressing the 'enter' button on the remote, but no visual cue of its existence is presented.

Invisible buttons are used primarily when only a single alternate video angle is presented (for a total of two angles). In this case, the user toggles between angles utilizing the 'enter' button on the remote, activating the hidden button whose action is to instruct the DVD playback device to display the angle not currently being viewed. One typical application for invisible buttons arises when the angles include a wide-angle view and a close up or zoom angle from a single perspective.

Due to the way multiangle tracks are stored on the DVD, it may take a current DVD playback device between two (2) to four (4) seconds to change the angle being displayed.

The DVD playback device can be instructed to change only the video track, change only the audio track, or change both. In most uses, the viewer will choose to switch the video track, while the audio track remains constant, yielding no glitches or dropouts in the audio. Switching the audio track will typically generate an audible dropout or discontinuity to occur. The length of any dropout will be dependent on the decoder specification for each DVD playback device.

When multiple DVD video angles are present, they are multiplexed with audio data, subpicture data (containing button highlights) and navigational information (including button commands). None of this information is shared across angles, and each angle's data is interleaved within interleave units (ILVUs) within Video Object (VOB) files which provide the physical structure for the data stored on a DVD.

While each button exists independently in each video angle, the prior art provides no mechanism for defining button commands that are differentiated by the video angle. In order to implement this desired differentiation in accordance with an embodiment of the present invention, manipulation of the multiplexed VOB files is required. Once multiplexed and interleaved, each file contains a number of Navigation packs, which contain information about navigational information and subpicture display options (button commands, highlight colors, etc.). Each Navigation pack containing a button command on the angle for which the command is to be changed must have the embedded command replaced by the desired command. This is done by locating the appropriate areas in the VOB file(s) and replacing the appropriate data. Care must be taken to avoid changing the amount of data in the VOB files, which may render them unusable.

In a live concert environment, multiple cameras are typically used to provide source material for the final video track. The final video track usually comprises images captured by various cameras but does not include all images from any particular camera. Therefore, many images recorded on various cameras are not selected in making the final video track. Consequently, the viewer of the final video track usually cannot view the music concert from different perspectives that occurred at the same moment.

Figure 5:
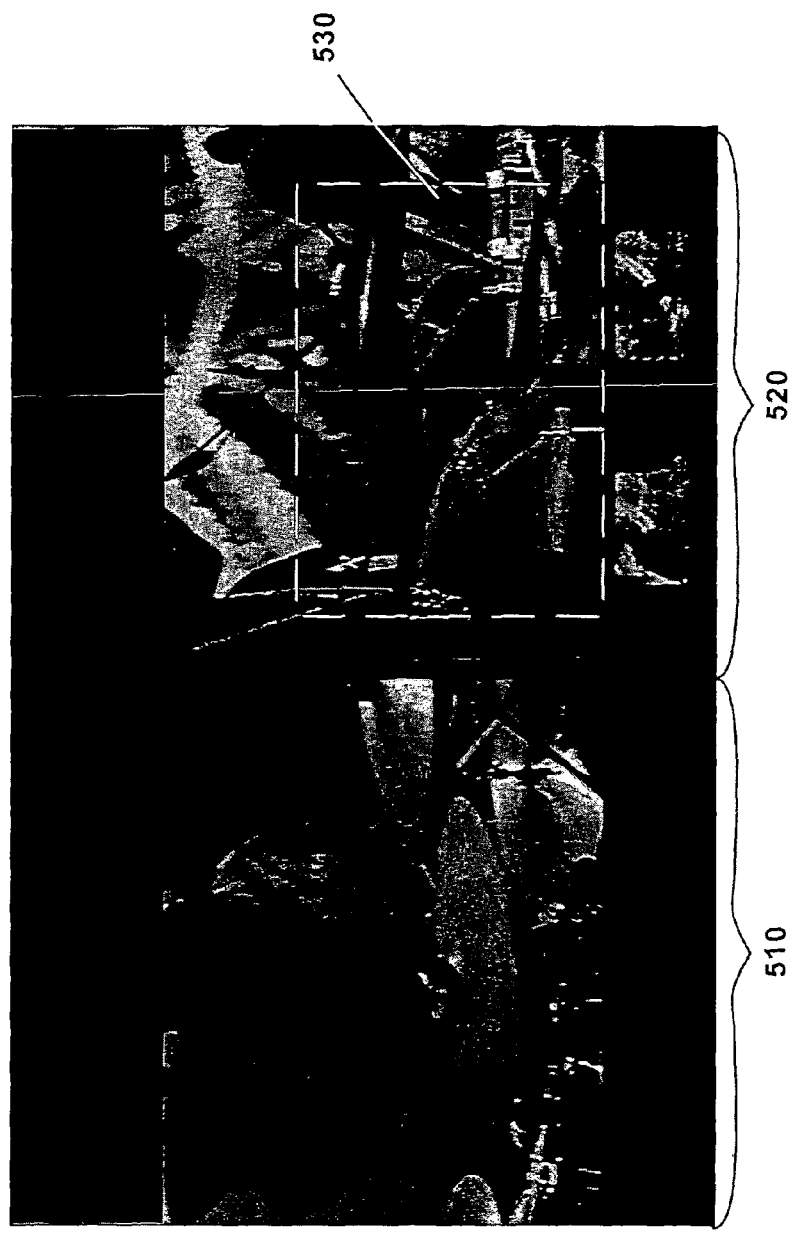
FIG. 5 illustrates various views of a music concert captured by multiple cameras.
Figure 6:
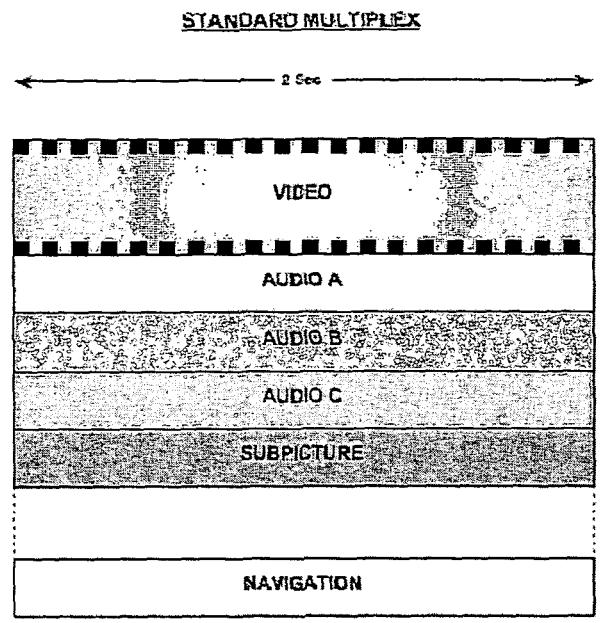
FIG. 6 shows a prior art portion of an object file of a DVD production having a single video angle.
Figure 7:
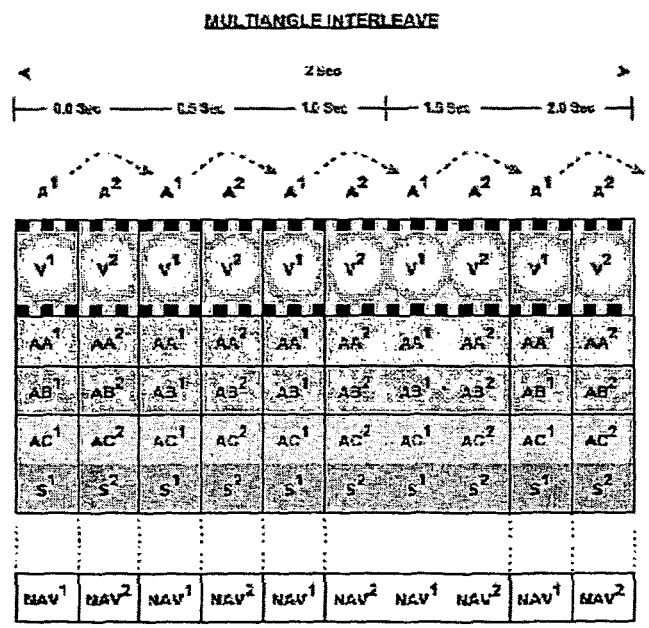
FIG. 7 shows a prior art object file with multiple video angles.

Because a musical performance often involves multiple musicians playing simultaneously, the viewer of the final video track may wish to view the performance of a particular musician from a particular perspective at a given moment of the concert. In order to provide the various perspectives, multiple cameras are strategically positioned to record a variety of angles. Each camera focuses on a particular aspect of concert performance. For example, as shown in FIG. 5, a fixed camera provides a specialty shot 510 of the performance of a drummer, and another fixed camera provides a specialty shot 520 of a musician's hands playing a music instrument.

To provide an immersive viewing experience, an intuitive interface is preferably provided. The interface uses cursor keys, such as may be found on most remote control devices or the keyboard of a computer viewing system, to navigate a virtual three-dimensional space between spatially arraigned multi-angle tracks. Thus, beginning with the viewer's initial point of view, the viewer may change their viewing perspective by navigating across the stage or panorama. In particular, by using the cursor keys, the viewer can scan to the left of center, if such views are available, by pressing the left arrow key. Similarly, the viewer can scan to the right, if such views are available, by pressing the right arrow key. The up arrow key enables the viewer to zoom in to provide a detailed view and the down arrow key zooms out to obtain a wide-angle perspective.

In another embodiment, a viewer interface includes two angles, one angle being a wide view and a second angle being a zoom view of up to about 300%. Other cameras can be zoomed optically up to about 3000%. Any number of cameras may be used in this embodiment but all cameras have the same viewing angle or perspective. The viewer may switch between the two angles by hitting the 'enter' key or other similar control device, such as a remote control device, to flip between the wide angle and the zoom angle. If more camera perspectives are available, the viewer may scroll through the available angles.

The command assigned to each button in an on-screen menu remains constant across angles. For instance, a button whose command instructs the DVD-Video playback device to display video angle 1 tells the device to display angle 1 whether the currently displayed angle is 1, 2, 3, 4, etc. In some cases, however, it is desirous to have only one button in an on-screen menu, a button whose command changes depending on the currently displayed angle. This allows a single button press by the user to select the next available angle, and avoids the interface issue of requiring the perceived redundancy and potential user confusion of having an on-screen button which selects the video angle currently being viewed. More details on a specific approach to using a single control to switch among multiple video tracks is discussed, below.

When there only two angles, the icons or thumbnails need not be visible in most applications, as the viewer will typically just toggle between the available angles. In most media productions, the wide-angle track will be the primary track and the zoom angle track (or tracks) will be considered the secondary track although it is to be understood that the designation decision is dependent on many factors and may vary from production to production. Graphic overlays can be used to highlight the zoom area of the wide shot that will be magnified upon viewer selection such as is illustrated by the dashed white line as generally indicated at 530. The graphical overlays are added during the post-production process as a semi transparent graphic overlay. Commercially available post-production tools, such as Adobe PhotoShop, Adobe After Effects, Newtek Lightwave 3D and Discreet Effect, may be used to create the graphic overlays. Alternatively, color enhancement in post-production may be used to quickly and effectively highlight the area covered by the zoom camera.

An embodiment of the present invention enhances viewer enjoyment by providing the viewer with the information needed to enable the selection of alternative angles without interrupting the playback of the media production. When a live event is recorded using multiple perspectives, an embodiment of the present invention provides multiple angles or perspectives of the event that are presented simultaneously during playback of the event. Advantageously, an embodiment of the present invention synchronizes the video tracks as each occurred during the recording of a live event. Each video perspective is aligned in logical reference to the actual live event. By way of example, the perspectives are preferably grouped by featured artist or by athletes, by spatial orientation so that the viewer can change the zoom views or by scanning left or right from the current angle.

Single-Control Selecting Among Multiple Video Tracks

During authoring of a DVD production a human operator, or author, decides what types of buttons, or other controls, will be active during playback of the DVD production. The button is assigned to a command, or function, such as assigning the button to a command to switch to a predetermined video track. Selectable playback of different video tracks is defined in data associated with the DVD production called a "navigation pack."

The active buttons are usually accompanied by button indicators that appear on-screen (e.g., on a television screen) during playback of the DVD when there are multi-angle tracks or other optional scene changes. When an active button is selected by a viewer, programmed commands are invoked instructing the DVD player to display one of the available angles, or scenes, associated with the selected button. Through different programming methods, the player can be instructed to change only the video track, change only the audio, or change both video and audio.

When utilizing on screen menus for multiangle stream selection, each button exists independently in each video angle, currently the DVD-Video specification does not provide for differentiating button commands by the video angle the button exists within—navigation data is replicated across all angles and it's specified as being duplicate data. In a preferred embodiment, object files generated by standard authoring system such as Sonic, Inc.'s "Scenarist," "Maestro" by Spruce Technologies, etc., are modified in order to allow a single button to switch between different streams.

Once multiplexed and interleaved, each object file contains a number of navigation packs which contain navigational information and sub-picture display options such as button commands, highlight colors, etc. Navigation packs are associated with a stream and occur at semi-regular intervals. For example, a navigation pack may repeat at ½ second, 1 second, 2 second, etc., intervals. One embodiment of the invention modifies the object file to replace button commands. For example, an author can designate that a given button is to be a "multiplex" button where successive presses of the button result in selection of different video tracks. In this case, existing relevant navigation packs in the object file are identified. The identified navigation packs are then modified so that existing embedded commands are replaced by the desired command. Commands can also be inserted and deleted, as desired, to achieve functionality. Replacement of existing commands is done by locating the appropriate offset in the video object file where the data for the specific button command is located and replacing the appropriate data. In a preferred embodiment, the overall size of the object file, number of navigation packs, and other characteristics of the object file are not changed to ensure that the object file is compatible for its intended purpose of generating a DVD that is compatible with standardized players. Care must be taken to avoid changing the amount of data in the video object files, which may result in undesired effects upon playback, or may render the DVD unreadable by a player.

In a preferred embodiment, modification of the object file occurs after an authoring session e.g., at some time after the object file including the navigation pack information (typically also including video, audio and other information) is created but before the master DVD data file is written.

Figure 8:
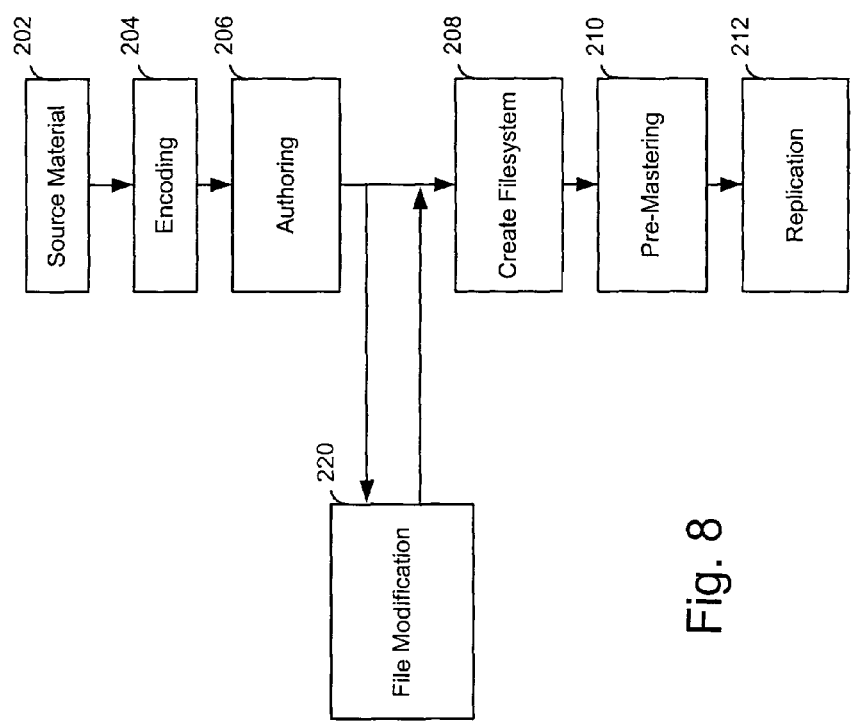
FIG. 8 illustrates steps in a DVD authoring process.

FIG. 8 illustrates steps in a DVD authoring process.

In FIG. 8, preparation of source material 202 includes edited video tracks, audio and other content such as menu graphics, titles, etc. The source material is used in encoding 204 where the material is converted into a format suitable for use with an authoring program. Authoring 206, includes several sub-steps performed at the direction of a human author who operates the authoring application, or other processes or tools. The authoring step includes laying out the content and determining where end user, or viewer, selections of different video tracks can occur. The authoring step also includes setting other characteristics of the finished production such as region codes, copy protection, etc.

At step 208 the files that will eventually reside on distributable media, such as on a DVD, are created. As described above, at least one file, the object file, includes navigation information. After creation of the object file, the object file can be optionally modified by changing the command assignments to user controls to add or change navigation, or other, functionality as indicated by file modification step 220.

The file modification step typically includes automated modification of the object file. For example, this step can be implemented by a programmed script, or other process or routine, to identify and replace desired information in the object file. Other embodiments can use a more detailed approach where an authoring front-end user interface is provided so that an author can set parameters to more easily specify changes to the object file. For example, an author may be provided with an interface where the author can specify that "button 1" is to be used to switch between video streams 1 and 2. The interface can be graphical so that assignments are made by clicking and dragging on icons, by means of a timeline, a tracklist, or by any other approach.

After file modification, the modified file is supplied to pre-mastering step 210 where the files are placed into a final format, such as a digital linear tape (DLT) format, before storing into the distribution media. Finally, in the replication step, the DLT is used to replicate the production into distribution media, such as a DVD.

Note that FIG. 8 is intended to illustrate one approach to file modification. Steps can be added to, or taken away from, the steps of FIG. 8. Not all of the steps need be practiced in any particular creation of a DVD or other production. Further the file modification may take place at a different point in the authoring process than after fileset creation. For example, file modification may take place after authoring step 206 and before fileset creation 208.

One embodiment allows changing navigation data in a playback device at a time at, or near, when the control information will be used during playback. For example, a DVD player can pre-read the control information into a local buffer or other storage area. The buffer can use solid state memory, a magnetic disk drive, etc. Once stored, a processor in the DVD playback device can parse and modify the control information. This allows modification of the navigation data as discussed, above, so that a DVD that has been manufactured and distributed without the one-button control feature can be modified to work as a one-button interface.

Portions of the DVD content, including video sequences, can be stored for purposes of modifying the control information or even the video content. Any amount of the DVD content can be stored, including the entire DVD. For example, the contents of the entire DVD can be copied to a hard disk drive and modified dynamically, as the content is being displayed, or "offline" at any time prior to playback of the content.

Many modifications to control data are possible that can result in various desirable features. For example, an interface can be made to display magnified fonts for people who can not see the regular size fonts easily. Graphics and control options can be suppressed so that, for example, certain areas of the DVD can be locked, or access restricted, as where parents might want to prevent children from using or viewing parts of the DVD.

Figure 9:
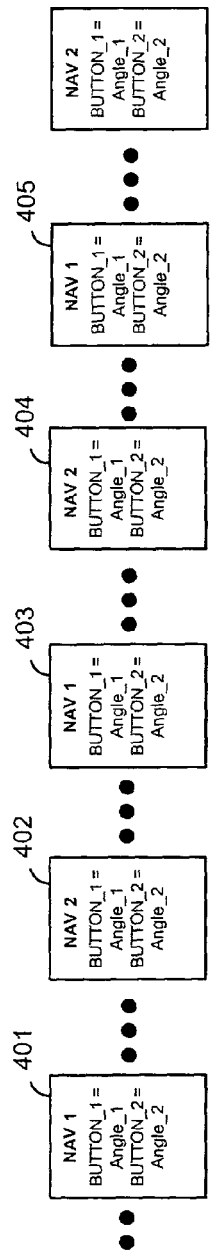
FIG. 9 illustrates navigation pack arrangements in the prior art.

FIG. 9 shows navigation packs in a DVD stream that has two different camera angles interleaved according to a standard DVD approach. The Navigation packs labeled "Nav 1" correspond to a video track for a first angle, "Angle__1." The Navigation packs labeled "Nav 2" correspond to a video track for a second angle, "Angle__2."

Each navigation pack includes button commands, or assignments. Each time a navigation pack is encountered one or more commands to assign functions to buttons on a user interface control (e.g., a television or DVD player remote control, computer keyboard, etc.) are loaded into the player. For purposes of switching streams, the command to assign a button to a specific stream is used. For example, in FIG. 9, pack 401 is loaded when the pack is encountered during playback of video track 1. Pack 401 causes BUTTON__1 to be assigned to Angle__1, and BUTTON__2 to be assigned to Angle__2.

After pack 401 is encountered, the playback device makes the indicated assignments so that if a user presses BUTTON__2, playback of video track 2, showing a second angle of the production, will be immediately displayed. If the viewer depresses BUTTON__1, playback will not be changed since the current video track that is playing is already the track corresponding to BUTTON__1. As playback proceeds, and assuming the viewer does not activate BUTTON__2 to change video streams, pack 403 will be encountered. Pack 403, simply maintains the present button assignments. Note that the requirement to restate redundant button assignments is dictated by the DVD standards. In some embodiments, such redundant information may be omitted.

If, instead, the playback device is playing video track 2 then pack 401 will not be loaded and its button assignments will not be made. Instead, pack 402 is encountered and the button assignments of pack 402 are loaded. Note, however, that the button assignments of pack 402 are the same as those in pack 401. This is a typical result of interactive DVD authoring systems that adhere to the DVD standards since the standards provide that a separate button be dedicated to a predetermined video track, or angle. Thus, in order to switch between two different angles, two separate buttons are needed.

Figure 10:
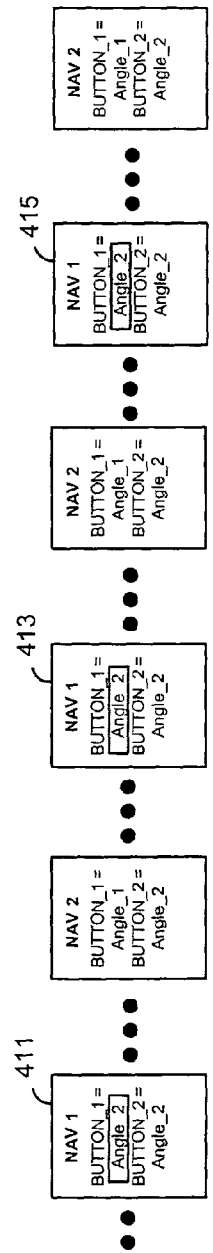
FIG. 10 illustrates a first modified navigation pack arrangement.

In a preferred embodiment, each of the packs 401, 403 and 405 from FIG. 9, are modified as 411, 413 and 415, respectively, as shown in FIG. 10. Note that only the assignment for BUTTON__1 needs to be modified to be associated with a command to switch to ANGLE__2 (as shown by the surrounding boxes) in order to achieve one-button switching. With the modified packs, activating BUTTON__1 during playback of video track one (i.e., Angle__1) results in switching the playback to video track 2 (i.e., Angle__2). Similarly, activating BUTTON__1 during playback of video track 2 results in switching playback to video track 1. Thus, one-button switching of video tracks is achieved by using command file modification after an authoring session.

Figure 11:
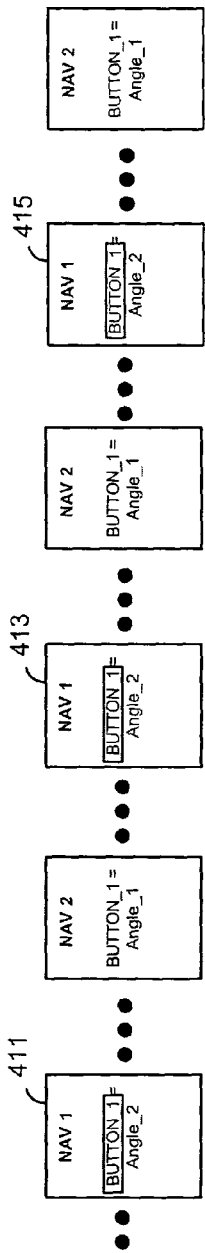
FIG. 11 illustrates a second modified navigation pack arrangement.

An alternative approach is to change the assignments for BUTTON__2 to a NULL value to prevent accidental switching by rendering BUTTON__2 non-functional. Other approaches can eliminate BUTTON__2 assignments entirely by removing the data that references BUTTON__2 and makes the association with a command. This approach is shown in FIG. 11. Removing data from an object file can be done in situations where changing the overall file size, or structure, is acceptable and could be desirable, for example, when it is advantageous to decrease the file size.

Figure 12:
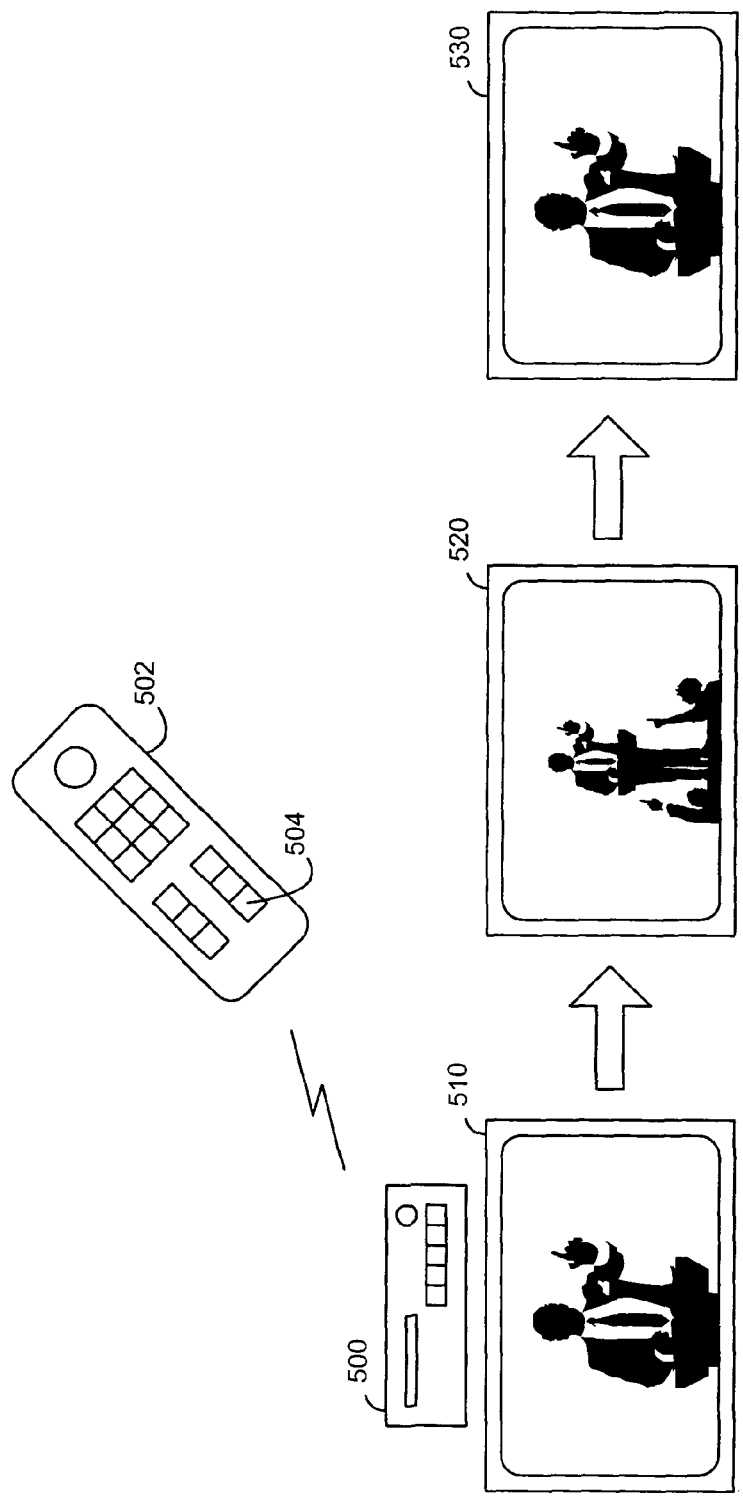
FIG. 12 shows single-button switching of video tracks.

FIG. 12 illustrates a preferred embodiment of a single-button control used to switch between full-screen video tracks.

In FIG. 12, remote control device 502 includes a variety of controls, including button 504. Upon depressing button 504, a signal is sent from the remote control device to DVD playback device 500. The playback device sends video signals to a display screen, such as a television set, and causes currently-displayed video track 510 to be replaced with alternate video track 520. In this example, the video tracks are two different zoom levels from a common viewpoint. Naturally, any type of image content change is possible. For example, the angles can differ in viewpoint placement, lens focal length, subject matter, visual effect, etc. Any manner of content may be used in the different video tracks.

A second selection of button 504 causes the video track to revert back to the track of 510, as shown at 530. Subsequent button presses swap between the two video tracks. One feature of this approach is that it is not necessary to have any visual information, such as thumbnail views or other indicators, to aid the viewer in knowing what controls correspond to different tracks, or angles. Thus, a full-screen image can be presented, as desired, without any other graphical elements that were not part of the originally-recorded production. Such an approach can be advantageous, for example, in live action shots such as sporting event, music videos, etc., where changing the viewable image, aspect ratio or other characteristics of the image can interfere with the originally captured action. Also, since the image area is maximized the viewer can enjoy the largest possible picture size and resolution. By presenting the images without the need for thumbnail images, or other visual indicators, a viewer is presented with a more accurate recreation of, for example, an original live performance or event.

The approach of multi-angle switching without the use of on-screen indicators also allows the user interface to be uniform across different playback devices. Where menus, thumbnails or other indicators are used the indicators are often handled differently among devices. By eliminating the need for visual aids in multi-angle switching the chances for incompatibilities of a player with the DVD content are reduced.

Other embodiments can use multiple display screens, for example, to allow specified buttons that control video switching on each available display.

Although the invention has been discussed primarily with respect to a single button being used to switch between two streams, it should be apparent that other variations are possible. More than one button assignment can be changed at a time. Button assignments for a given button can also change due to other events besides a stream selection. For example, button assignments can change after a time interval expires, based upon a signal generated by the playback device, user input device, or from a remote source such as the Internet or an external hardware device. Although a DVD player remote control has been discussed as the user input device, any user input device such as a mouse, trackball, light pen, motion or position detector, etc., can be used. Any type of control can be used to trigger a stream selection or other action.

Although the invention has been described primarily with respect to playback of productions from a DVD, any storage media or playback technology, such as video-on-demand cable or satellite systems can be used as the source of the audiovisual production. Further, the DVD playback device and the messaging device can be separate devices. For example, a cell phone or personal digital assistant (commonly referred to as a PDA) can be used as a messaging and control device while the audiovisual production is playing on a remote DVD player connected to the Internet.

The term "process" is intended to include components such as hardware, software or a combination of both used to achieve a function. Portions of the function can be performed by multiple, physically or geographically separate components. Also, portions of the function can be performed at different times by one or more components.

Although embodiments of the invention are described as manipulating, or using, a "navigation pack," any type of data, data structure, object, type or collection of information may be employed. Other mechanisms may become available to control selection of video segments, tracks, streams or other visual or audio information as the standards or industry practices change. Similarly, the use of the term "object file" is intended to mean any type of file or other collection of data.

In general, any type of playback device, or devices, e.g., computers, consumer electronic devices, digital processor-based devices, and custom circuitry, can be used for transmission of data, playback, execution of a viewer interface and to perform any of the functions and features described herein. Processing can be performed at any physical location and can be done by a single processing unit, or in a co-processing or parallel arrangement with multiple processors. Further, although time codes for messages have been described, any other types of time indications that associate the messages to points in time of an audiovisual production may be used.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed. Thus, the scope of the invention is to be determined solely by the appended claims.

What is claimed is:

1. A method for preparing source files for creation of a DVD in a DVD authoring system, the method comprising:
    identifying video content for inclusion on the DVD, wherein the video content includes first and second tracks;
    creating an object file, wherein the object file includes first and second navigation packs, wherein the first navigation pack is accessed during playback of the first track and wherein the second navigation pack is accessed during playback of the second track, wherein the first navigation pack associates a first control button with the first track and a second control button with the second track, wherein the second navigation pack also associates the first control button with the first track and a second control button with the second track;
    accepting a signal from a user input device operated by an author using the authoring system to provide a single button switching function selectable by a user upon playback of the DVD in a DVD player;
    automatically modifying the navigation packs in the object file so that the first navigation pack associates a particular control button with the second track and so that the second navigation pack associates the particular control button with the first track; and
    subsequent to the above acts, transferring the video content and the modified object file for use in creating the DVD so that at a time of playing back the DVD the first and second tracks can be selected by the particular control button, wherein an audio track associated with the first track continuously is played while playback is switched from the first track to the second track.

2. The method of claim 1, the method further comprising causing a plurality of navigation packs associated with a first stream to occur at specified intervals, wherein the plurality of navigation packs provide an association with the particular control button.

3. The method of claim 1, wherein automatically modifying the navigation packs in the object file further comprises identifying and replacing object file information.

4. The method of claim 1, the method further comprising providing a graphical user interface via which the author can specify which control is to be used to switch between author specified streams.

5. The method of claim 1, wherein the first track is associated with a first viewing angle and the second track is associated with a second viewing angle.

6. The method of claim 1, wherein automatically modifying the navigation packs in the object file further comprises avoiding changing an amount of data in the object file.

7. An apparatus for preparing source files for creation of a DVD in a DVD authoring system, the apparatus comprising:
    a processor;
    a computer-readable storage device including instructions executable by the processor for performing the following:
    identifying video content for inclusion on the DVD, wherein the video content includes first and second tracks;
    creating an object file, wherein the object file includes first and second navigation packs, wherein the first navigation pack is accessed during playback of the first track and wherein the second navigation pack is accessed during playback of the second track, wherein the first navigation pack associates a first control button with the first track and a second control button with the second track, wherein the second navigation pack also associates the first control button with the first track and a second control button with the second track;
    accepting a signal from a user input device operated by an author using the authoring system to provide a single button switching function selectable by a user upon playback of the DVD in a DVD player;
    automatically modifying the navigation packs in the object file so that the first navigation pack associates a particular control button with the second track and so that the second navigation pack associates the particular control button with the first track; and subsequent to the above acts, transferring the video content and the modified object file for use in creating the DVD so that at a time of playing back the DVD the first and second tracks can be selected by the particular control button.

8. The apparatus of claim 7, wherein the computer-readable storage device includes instructions executable by the processor for performing the method of causing a plurality of navigation packs associated with a first stream to occur at specified intervals, wherein the plurality of navigation packs provide an association with the particular control button.

9. The apparatus of claim 7, wherein automatically modifying the navigation packs in the object file further comprises identifying and replacing object file information.

10. The apparatus of claim 7, wherein the computer-readable storage device includes instructions executable by the processor for performing the method of providing a graphical user interface via which the author can specify which control is to be used to switch between author specified streams.

11. The apparatus of claim 7, wherein the first track is associated with a first viewing angle and the second track is associated with a second viewing angle.

12. The apparatus of claim 7, wherein automatically modifying the navigation packs in the object file further comprises avoiding changing an amount of data in the object file.

13. A non-transitory computer-readable storage device including instructions executable by a processor for creation of a DVD in a DVD authoring system, the computer-readable storage device comprising one or more instructions for performing the following:

identifying video content for inclusion on the DVD, wherein the video content includes first and second tracks;

creating an object file, wherein the object file includes first and second navigation packs, wherein the first navigation pack is accessed during playback of the first track and wherein the second navigation pack is accessed during playback of the second track, wherein the first navigation pack associates a first control button with the first track and a second control button with the second track, wherein the second navigation pack also associates the first control button with the first track and a second control button with the second track;

accepting a signal from a user input device operated by an author using the authoring system to provide a single button switching function selectable by a user upon playback of the DVD in a DVD player;

automatically modifying the navigation packs in the object file so that the first navigation pack associates a particular control button with the second track and so that the second navigation pack associates the particular control button with the first track; and subsequent to the above acts, transferring the video content and the modified object file for use in creating the DVD so that at a time of playing back the DVD the first and second tracks can be selected by the particular control button.

14. The non-transitory computer-readable storage device of claim 13, further comprising instructions executable by the processor for performing the method of causing a plurality of navigation packs associated with a first stream to occur at specified intervals, wherein the plurality of navigation packs provide an association with the particular control button.

15. The non-transitory computer-readable storage device of claim 13, wherein automatically modifying the navigation packs in the object file further comprises identifying and replacing object file information.

16. The non-transitory computer-readable storage device of claim 13, further comprising instructions executable by the processor for performing the method of providing a graphical user interface via which the author can specify which control is to be used to switch between author specified streams.

17. The non-transitory computer-readable storage device of claim 13, wherein the first track is associated with a first viewing angle and the second track is associated with a second viewing angle.

18. The non-transitory computer-readable storage device of claim 13, wherein automatically modifying the navigation packs in the object file further comprises avoiding changing an amount of data in the object file.

* * * * *